(12) United States Patent
Gloden et al.

(10) Patent No.: US 8,702,126 B2
(45) Date of Patent: Apr. 22, 2014

(54) DEVICE FOR SECONDARY ENERGY MANAGEMENT IN A STEERING COLUMN ASSEMBLY

(75) Inventors: Shawn Grayson Gloden, Waterford, MI (US); Sarah Beth Certeza, Grosse Pointe Farms, MI (US); Alvin Matti, Sterling Heights, MI (US); Daniel Blaine Bollinger, Dearborn Heights, MI (US); Leonard Anthony Shaner, New Baltimore, MI (US); William Moore Sherwood, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/397,649

(22) Filed: Feb. 15, 2012

(65) Prior Publication Data

US 2013/0207370 A1 Aug. 15, 2013

(51) Int. Cl.
*B62D 1/19* (2006.01)

(52) U.S. Cl.
USPC .............. 280/777; 74/492; 296/187.05

(58) Field of Classification Search
USPC ............ 280/775, 777; 74/492, 493, 527; 188/371, 377; 296/187.05, 70, 193.02
See application file for complete search history.

(56) References Cited

U.S. PATENT DOCUMENTS

| | | | |
|---|---|---|---|
| 3,392,599 A | 7/1968 | White | |
| 3,394,613 A | 7/1968 | Curtindale | |
| 3,472,093 A | 10/1969 | Tenniswood | |
| 3,665,777 A | 5/1972 | Jensen | |
| 3,788,148 A | 1/1974 | Connell et al. | |
| 3,921,747 A * | 11/1975 | Suzuki et al. | 180/78 |
| 4,006,647 A | 2/1977 | Oonuma et al. | |
| 4,014,219 A | 3/1977 | Feustel et al. | |
| 4,086,825 A | 5/1978 | Badcock et al. | |
| 4,194,411 A * | 3/1980 | Manabe et al. | 74/492 |
| 4,241,937 A * | 12/1980 | Eggen et al. | 280/777 |
| 4,411,167 A | 10/1983 | Mohr | |
| 4,627,306 A * | 12/1986 | Berenjian | 74/492 |
| 4,655,475 A | 4/1987 | Van Gelderen | |
| 4,703,669 A * | 11/1987 | Hyodo | 74/492 |
| 4,886,295 A | 12/1989 | Browne | |
| 4,914,970 A | 4/1990 | Mastrofrancesco et al. | |
| 4,949,992 A * | 8/1990 | Abramczyk | 280/777 |
| 4,951,522 A * | 8/1990 | Chowdhury et al. | 74/492 |
| 5,026,092 A * | 6/1991 | Abramczyk | 280/777 |
| 5,052,715 A * | 10/1991 | Ervin et al. | 280/775 |

(Continued)

FOREIGN PATENT DOCUMENTS

| | | |
|---|---|---|
| JP | 11048990 A | 2/1999 |
| JP | 2001-334943 A | 12/2001 |
| WO | WO 03/101809 A1 | 12/2003 |
| WO | WO 2008/018818 A1 | 2/2008 |

OTHER PUBLICATIONS

Bengt Pipkorn et al., "Car Driver Protection at Frontal Impacts Up to 80 KM/H (50 MPH)", Paper No. 05-0102, undated.

*Primary Examiner* — Ruth Ilan
*Assistant Examiner* — Darlene P Condra
(74) *Attorney, Agent, or Firm* — Jones Robb, PLLC; Jason Rogers

(57) ABSTRACT

A pencil brace is incorporated into a cross car assembly of an automotive vehicle as a secondary energy absorption device to assist in managing the energy and controlling the column stroke due to a collision.

12 Claims, 6 Drawing Sheets

(56) References Cited

U.S. PATENT DOCUMENTS

| | | |
|---|---|---|
| 5,070,741 A | 12/1991 | Ervin et al. |
| 5,081,879 A | 1/1992 | Pidgeon |
| 5,085,467 A | 2/1992 | Converse |
| 5,390,956 A * | 2/1995 | Thomas ........................ 280/777 |
| 5,427,411 A * | 6/1995 | Iwasaki et al. ................ 280/777 |
| 5,487,562 A | 1/1996 | Hedderly et al. |
| 5,497,675 A * | 3/1996 | Brown et al. ................... 74/492 |
| 5,820,163 A | 10/1998 | Thacker et al. |
| 5,875,686 A * | 3/1999 | Kinoshita et al. ............... 74/492 |
| 6,152,488 A | 11/2000 | Hedderly et al. |
| 6,170,873 B1 | 1/2001 | Jurik et al. |
| 6,454,302 B1 | 9/2002 | Li et al. |
| 6,749,221 B2 | 6/2004 | Li |
| 7,300,071 B2 * | 11/2007 | Lee ................................ 280/777 |
| 7,527,294 B2 | 5/2009 | Porter et al. |
| 7,625,009 B2 * | 12/2009 | Ridgway et al. ............. 280/777 |
| 7,669,500 B2 * | 3/2010 | Matsui et al. ................... 74/493 |
| 7,780,196 B2 | 8/2010 | Cymbal et al. |
| 7,798,526 B2 * | 9/2010 | Lopez et al. .................. 280/777 |
| 8,042,833 B2 | 10/2011 | Johnson et al. |
| 2007/0228717 A1 * | 10/2007 | Tanai ............................ 280/777 |
| 2008/0238070 A1 * | 10/2008 | Bodtker ........................ 280/777 |
| 2011/0204608 A1 | 8/2011 | Sun et al. |

* cited by examiner

DEVICE FOR SECONDARY ENERGY MANAGEMENT IN A STEERING COLUMN ASSEMBLY

TECHNICAL FIELD

The present teachings relate generally to energy absorbing devices and systems for an automotive vehicle. More specifically, the present teachings relate to an energy absorbing device that is used to manage energy within the steering column of an automotive vehicle.

BACKGROUND

In automotive vehicles, steering columns are designed to collapse during a collision to reduce the collision force transferred to the vehicle operator engaging the steering wheel. However, the steering column and driver air bag thereon, can also be used to restrain the vehicle operator to a degree that prevents the vehicle operator contacting the vehicle windshield. There are many variations on known deformable crash features and designs of steering column assemblies that provide such energy dissipation. For example, many steering column assemblies are set up so that the steering column is released from its supporting structure in response to collapse of the steering column. Such a collapse occurs when the vehicle operator applies a force on the steering wheel due to a frontal impact collision. In a frontal collision, to mitigate injury, the energy of the occupant must be managed by any or all of the restraints, as part of a restraint system, such as, seat belts, an air bag and the steering column. The restraints must be designed specific to the vehicle to reduce injury for crashes at varying speeds and provide safety for occupants of all sizes whether they are belted or unbelted. Deformable and collapsible steering column assemblies are examples of designs used. Some of the different presentations for these assemblies include, for example, a breakaway shaft assembly, breakaway capsules, and energy absorption straps. See also, e.g., U.S. Pat. Nos. 5,052,715, 4,627,306, 5,820,163, 5,070,741, 5,085,467, 4,086,825, each assigned to the assignee of this present teaching, and herein incorporated by reference in their entireties.

In many column assemblies, including some of those incorporated herein, upper rake brackets or straps may be used as the primary energy absorbing and management devices. During the collision, the upper rake brackets and/or straps will deform and bend upon load impact delivered from an external force being applied to the cross car assembly.

The shifting or sliding of the steering column during a frontal collision is referred to as the column stroke. Specifically, column stroke is the amount in distance that the steering column slides before it is stopped by an energy absorbing and management device, and this distance may vary between vehicle programs and steering column assemblies. Column stroke may be affected by such factors as vehicle design, whether a vehicle occupant is belted or unbelted at the time of the collision, and whether the vehicle operator is a $50^{th}$ percentile (approximately 5'10", 185 lbs.) or $5^{th}$ percentile (approximately 5'4", 105 lbs.) vehicle occupant (approximations based on standard height and weight averages of general population). As can be understood by one of skill in the art, it is known or can be computed how much force an average belted occupant asserts on the steering column during a collision as compared to an average unbelted occupant, given the height and weight of the vehicle occupant. When a vehicle operator is belted, it is desirable to have a cross car assembly that generates a large amount of column stroke to manage the energy in conjunction with the seat belt, as the seat belt can be used to restrain the vehicle operator. Alternatively, when the vehicle operator is unbelted, and therefore not restrained by the seat belt, it is desirable to limit the column stroke to restrain the vehicle operator and thereby reduce the interaction of the vehicle operator with the vehicle windshield. For instance, when crash testing in an unbelted crash mode results in the vehicle operator contacting the windshield, that indicates the column stroke was too large relative to the impact of the collision and other circumstantial factors, so that the force of the vehicle operator contacting the steering wheel in response to the initial frontal impact of the collision was not managed efficiently. This illustrates that the existing energy absorbing devices currently employed are at their design limit. Thus, in an effort to control and limit the amount of column stroke in order to better manage the energy of the impact, it is desirable to achieve a balance between limiting column stroke for a $50^{th}$ percentile vehicle occupant, while maintaining the chest acceleration and deflection for a $5^{th}$ percentile vehicle occupant, and to manage impact energy absorption so that it is suitable for both belted and unbelted vehicle occupants. Accordingly, a need exists to provide a secondary energy absorption device to further assist in managing and dissipating the kinetic energy during the collision of a vehicle operator with the steering column. A need also exists to provide a design of a secondary energy absorption device that is adaptive to many different vehicle programs, easy to manufacture and incorporate into a vehicle, and cost-effective to make and use.

SUMMARY

In the event of a severe frontal impact, it can be advantageous to employ a secondary energy absorbing and management device to provide additional energy management to mitigate the impact of a force from the vehicle operator's engagement with the restraint system. Generally, the primary energy absorbing and management device(s) will deform first and then the secondary energy absorbing and management device will deform and bend to further dissipate energy from the vehicle operator upon contact with the restraint system.

In accordance with various exemplary embodiments, the present teachings provide a pencil brace for use in a cross car assembly having a longitudinal axis, the pencil brace including a height sufficient to make contact with a component of the cross car assembly; a width sufficient to span a predetermined portion of the cross car assembly; and a shape sufficient to withstand a predetermined impact load, the shape including one or more portions suitable for attachment to a vehicle structural component of the cross car assembly, wherein the pencil brace is configured to prevent movement of the first component of the cross car assembly along the longitudinal axis.

The present teachings further provide a pencil brace, wherein the first component of the cross car assembly is a compression bracket and the vehicle structural component is a set of cross car beam shoes, wherein the cross car assembly further comprises a column shaft, an upper shaft jacket, a lower column bracket, and an upper rake bracket, wherein the upper shaft and upper jacket partially and rotatably surrounds the column shaft, and is telescopically collapsible relative to a lower portion of the cross car assembly, wherein the compression bracket attaches to the upper rake bracket to partially enclose the upper jacket, and wherein the upper rake bracket is secured to the cross car beam shoes, and wherein the lower column bracket is secured to the cross car beam shoes.

The present teachings further provide a pencil brace, wherein the cross car assembly includes a primary impact energy absorbing structure configured to deform and bend upon load impact during column stroke, and wherein the pencil brace is configured to deform and bend upon load impact when there is excessive column stroke not controlled by the primary impact energy absorbing structure.

The present teachings further provide a pencil brace, wherein the primary impact energy absorbing structure comprises at least one mounting capsule and at least one strap, the at least one mounting capsule being configured to deform and bend upon load impact during column stroke.

The present teachings further provide a pencil brace, wherein the pencil brace is secured to the cross car assembly at an angle with the longitudinal axis of the column shaft, and wherein the angle further facilitates the contact of the pencil brace with the first component of the cross car assembly during a collision.

In accordance with various exemplary embodiments, the present teachings provide a cross car assembly, including a column shaft situated within an upper shaft jacket, an upper rake bracket to mount the column shaft to a vehicle support structure; at least one primary energy absorbing and management device configured to deform upon a frontal impact of a vehicle to allow column stroke and manage impact energy; a pencil brace configured to act as a secondary energy absorbing and management device and configured to stop or limit column stroke after the primary energy absorbing and management device has deformed.

The present teachings further provide a cross car assembly, wherein the frontal impact generates one or more forces during a collision, wherein the at least one primary energy absorbing and management device initially deforms according to a set load and distance and the pencil brace deforms according to any residual energy.

The present teachings further provide a cross car assembly, wherein the pencil brace is mounted directly or indirectly to the vehicle support structure.

The present teachings further provide a cross car assembly, wherein the at least one primary energy absorbing and management device is used to mount a compression bracket to the upper rake bracket, and wherein the at least one primary energy absorbing and management device is released upon application of a force from an occupant.

The present teachings further provide a cross car assembly, wherein the pencil brace stops movement of the compression bracket and deforms to allow limited movement of the compression bracket once the primary energy absorption device has reached a predetermined distance from the compression bracket, and that predetermined distance defines a column stroke that occurs before the compression bracket strikes the pencil brace.

The present teachings further provide a cross car assembly, wherein the pencil brace is mounted to be spaced a predetermined distance from the compression bracket, and that predetermined distance defines a column stroke that occurs before the compression bracket strikes the pencil brace.

The present teachings further provide a cross car assembly, wherein the pencil brace is mounted at an offset angle.

The present teachings further provide a cross car assembly, wherein the pencil brace strikes only the compression bracket upon column stroke.

The present teachings further provide a cross car assembly, further including two primary energy absorbing and management devices that include a capsule and a strap.

In accordance with various exemplary embodiments, the present teachings provide a method for controlling column stroke in a cross car assembly during a frontal impact, the method including the steps of absorbing frontal impact energy with a primary energy absorbing and management device configured to deform upon application of a force from an occupant; absorbing frontal impact energy with a pencil brace configured to act as a secondary energy absorbing and management device and configured to stop or limit column stroke and deform to manage any residual energy beyond the primary energy absorbing device.

The present teachings provide a method further including mounting at least one primary energy absorbing and management device to an upper rake bracket of the cross car assembly, wherein the at least one primary energy absorbing and management device is released once the primary energy absorption device has reached a predetermined distance from the compression bracket, and that predetermined distance defines a column stroke that occurs before the compression bracket strikes the pencil brace.

The present teachings provide a method further including stopping movement of the compression bracket with the pencil brace or allowing limited movement of the compression bracket upon deformation of the pencil brace.

Additional objects and advantages of the present teachings will be set forth in part in the description which follows, and in part will be obvious from the description, or may be learned by practice of the present teachings. Various objects and advantages of the present teachings will be realized and attained by means of the elements and combinations particularly pointed out in the appended claims.

It is to be understood that both the foregoing general description and the following detailed description are exemplary and explanatory only and are not restrictive of the present teachings.

The accompanying drawings, which are incorporated in and constitute a part of this specification, illustrate embodiments of the present teachings and together with the description, serve to explain the principles of the present teachings.

BRIEF DESCRIPTION OF THE DRAWINGS

At least some features and advantages will be apparent from the following detailed description of embodiments consistent therewith, which description should be considered with reference to the accompanying drawings, wherein.

Although the following detailed description makes reference to illustrative exemplary embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. The illustrated exemplary embodiments are not intended to limit the disclosure. To the contrary, the disclosure is intended to cover alternatives, modifications, and equivalents.

Figure 1:
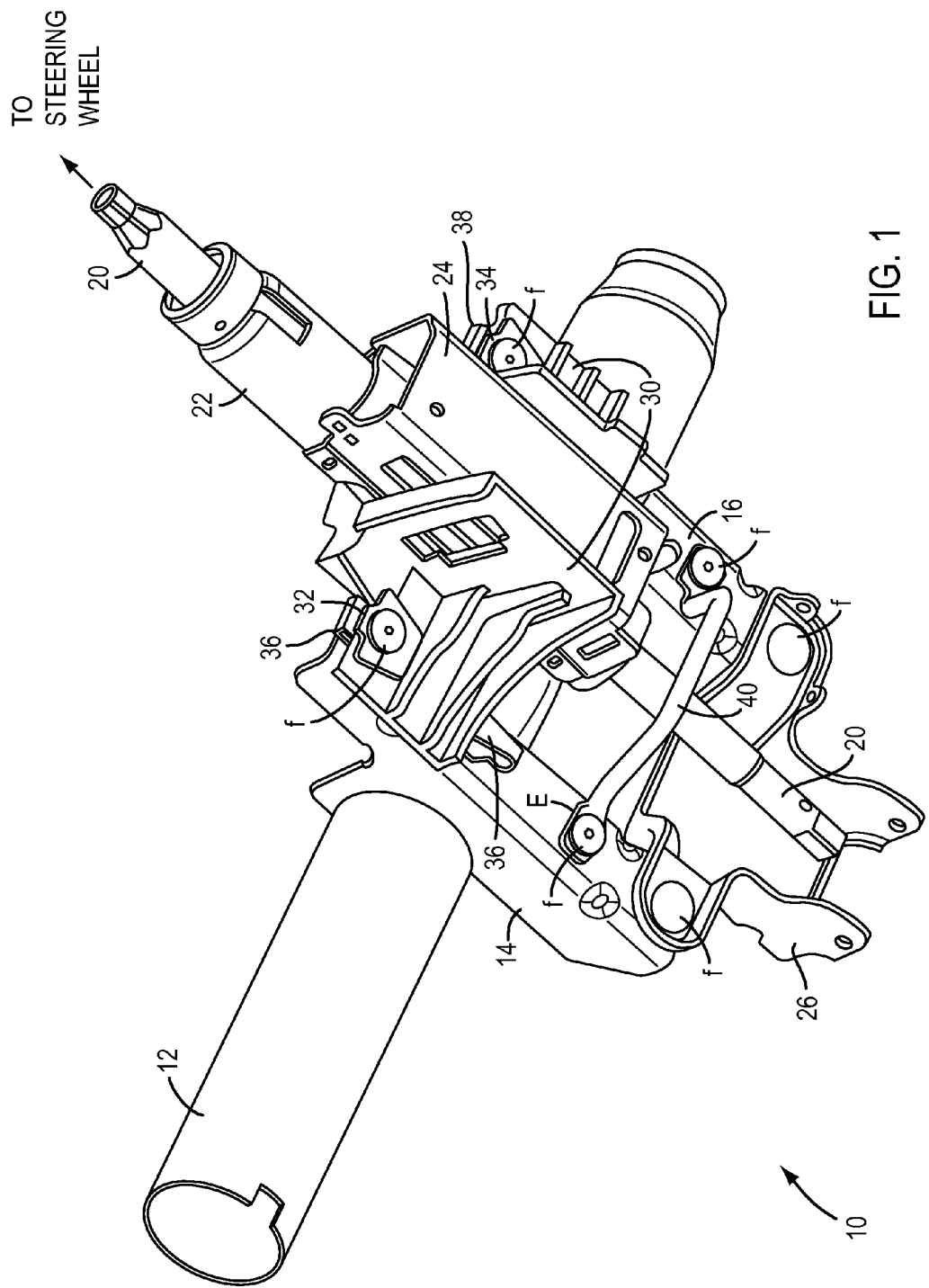
FIG. 1 is a perspective view of an exemplary embodiment of a cross car assembly of an automotive vehicle including an energy absorbing device made in accordance with the present teachings.

In automotive vehicles, a steering column is typically attached to a support structure which is rigidly secured to a vehicle structure. As depicted in FIG. 1, a cross car assembly 10 can be secured to a vehicle support structure, such as a cross car beam 12, as depicted. The vehicle support structure can be any structural component that assists in the reinforcement of the vehicle structure and is preferably arranged transversely within the vehicle, and thus, is not limited to the exemplary disclosure of the cross car beam 12 as depicted in the figures. It is contemplated that in certain exemplary embodiments, the cross car assembly 10 may be attached to other vehicle support structures as would be appreciated by those skilled in the art. In the illustrated embodiment, the attachment of the cross car assembly 10 to the cross car beam 12 is facilitated by a set of cross car beam shoes 14, 16, each fitting snuggly against the cross car beam 12. The set of cross car beam shoes 14, 16 can be secured to the cross car beam 12 by one or more known fastening mechanisms. As used herein, the terms "fasteners," "fastening mechanisms," or variants thereof, refer to any known fasteners in the art including, but not limited to adhesives, pins, M8 fasteners, screws, bolts, clips, and brackets, and are labeled as item "f" in the accompanying figures. The cross car beam shoes 14, 16 can act as upper rake brackets for attachment of the cross car assembly 10 to the cross car beam 12. The cross car beam shoes 14, 16 can further facilitate the attachment and securing of other vehicular components to an additional vehicle support structure or the cross car assembly 10, for example. The cross car beam shoes 14, 16 provide stabilization and support for surrounding structures. The cross car beam shoes 14, 16 may be made of a variety of sturdy materials including, but not limited to, steel, aluminum or polymers. It is contemplated that other upper rake brackets or structural fastening components may be used to secure the cross car assembly 10 to a vehicle support structure, such as the cross car beam 12 as shown, and the disclosure of the cross car beam shoes 14, 16 as an attachment and securing device is not meant to be limiting.

As is depicted in FIGS. 1-5, the cross car assembly 10 includes an upper shaft jacket 22 configured to integrally contact a column shaft 20, which connects to a steering wheel (not shown). The upper shaft jacket 22 partially and rotatably surrounds the column shaft 20, which can be situated within the upper shaft jacket 22. In certain embodiments of the present teachings, the upper shaft jacket 22 is telescopically collapsible relative to a lower portion of the cross car assembly 10, including a lower column bracket 26 and a lower portion of the column shaft 20. As will be apparent to those skilled in the art, the cross car assembly 10, and in particular, the components surrounding and including the column shaft 20, may adopt a variety of configurations known in the art, and therefore, the present disclosure is not meant to be limiting.

In certain embodiments of the present teachings, lower column bracket 26 is secured to the cross car beam shoes 14, 16, for example, using known fasteners f. Construction of the lower column bracket 26 is well known in the art and further description of such is deemed unnecessary here. The lower end of column shaft 20 can be attached to the cross car beam shoes 14, 16 when it is secured to the lower column bracket 26. The lower column bracket 26 further stabilizes the cross car assembly 10 by securing it to the set of cross car beam shoes 14, 16, for example, using known fasteners f.

A structural component, such as a compression bracket 24 depicted in FIGS. 1-4, partially encloses the column shaft 20 and is situated adjacent to the upper shaft jacket 22. An upper rake bracket 30 attaches to the compression bracket 24 to partially enclose the column shaft 20 and the upper shaft jacket 22, and is situated along the axis of the column shaft 20 between the lower column bracket 26 and the end of the column shaft 20 that leads to the steering wheel (not shown), as depicted in the exemplary embodiment of FIGS. 1-4. Construction of the upper rake bracket 30 is well known in the art and further description of such is deemed unnecessary here. It is contemplated that other structural components may be incorporated into the cross car assembly in place of the compression bracket described herein, as would be appreciated by those skilled in the art.

The upper rake bracket 30 assists in facilitating attachment of the cross car assembly 10 to the cross car beam 12 in a manner known by those skilled in the art. For example, the upper rake bracket 30 can attach to the cross car beam shoes 14, 16, as depicted, using known fasteners f. The upper rake bracket 30 can also attach to the compression bracket 24 to partially enclose and further stabilize the cross car assembly 10. The upper rake bracket 30 further facilitates various attachments of the cross car assembly 10 to vehicular components (not shown) such as, for example, support structures and mechanical gears, by providing numerous connection points. In accordance with certain embodiments of the present teachings, the combination of the cross car beam shoes 14, 16 in conjunction with the upper rake bracket 30 and the lower column bracket 26 collectively stabilize and secure the cross car assembly 10 to a vehicle support structure. It is contemplated that other structural components may be used to help stabilize and support the cross car assembly.

The upper rake bracket 30 can be attached to energy absorbing and management devices, such as a mounting capsule and an energy absorbing strap. As briefly mentioned above, in the event of a frontal impact collision, the energy absorbing devices will deform upon load impact from the collision to dissipate kinetic energy of the collision during column stroke.

Figure 2:
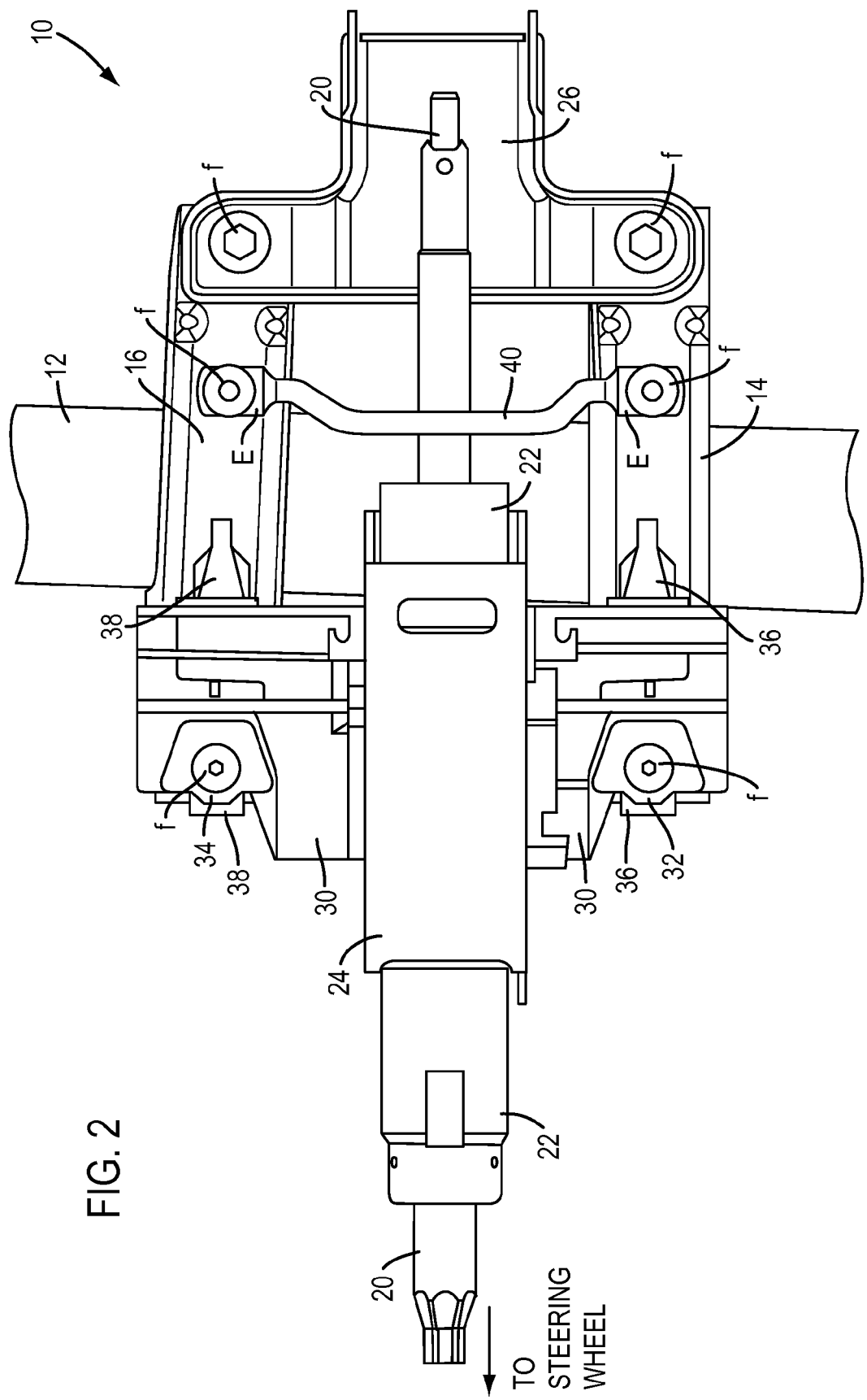
FIG. 2 is a bottom view, of the exemplary embodiment of a cross car assembly of FIG. 1.
Figure 3:
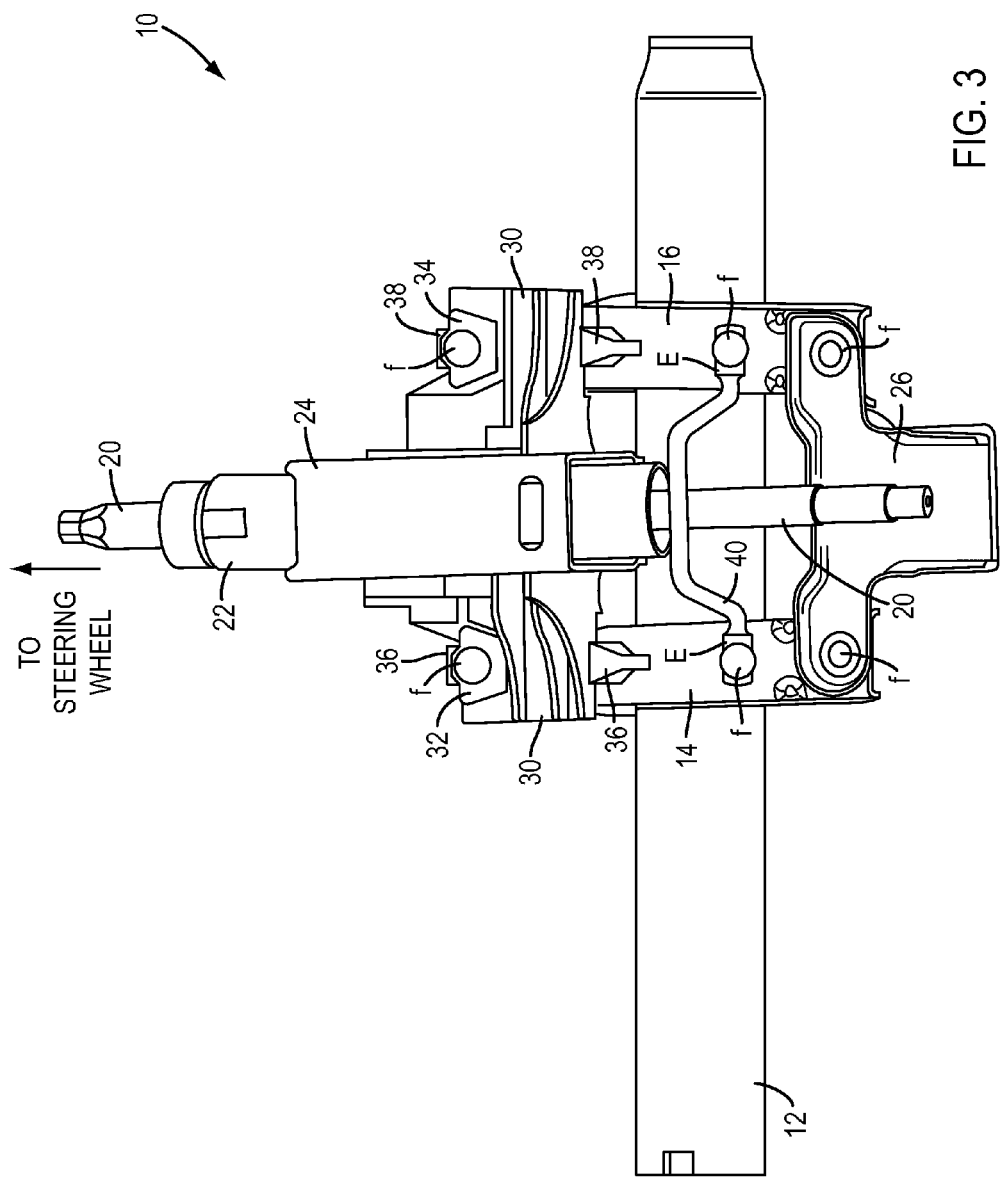
FIG. 3 is another bottom view, of the exemplary embodiment of a cross car assembly of FIG. 1.
Figure 4:
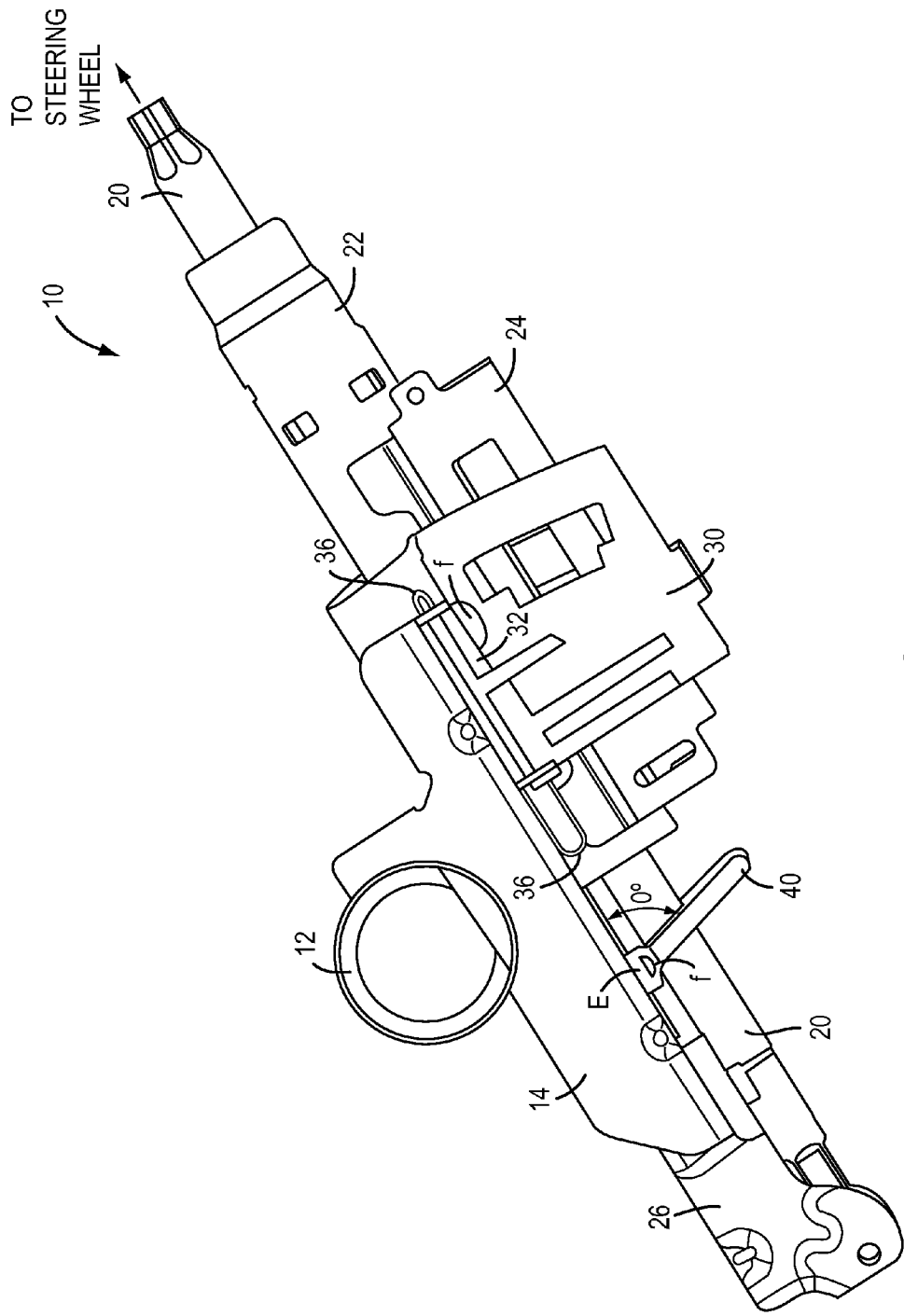
FIG. 4 is a side view of the exemplary embodiment of the cross car assembly of FIG. 1.
Figure 5:
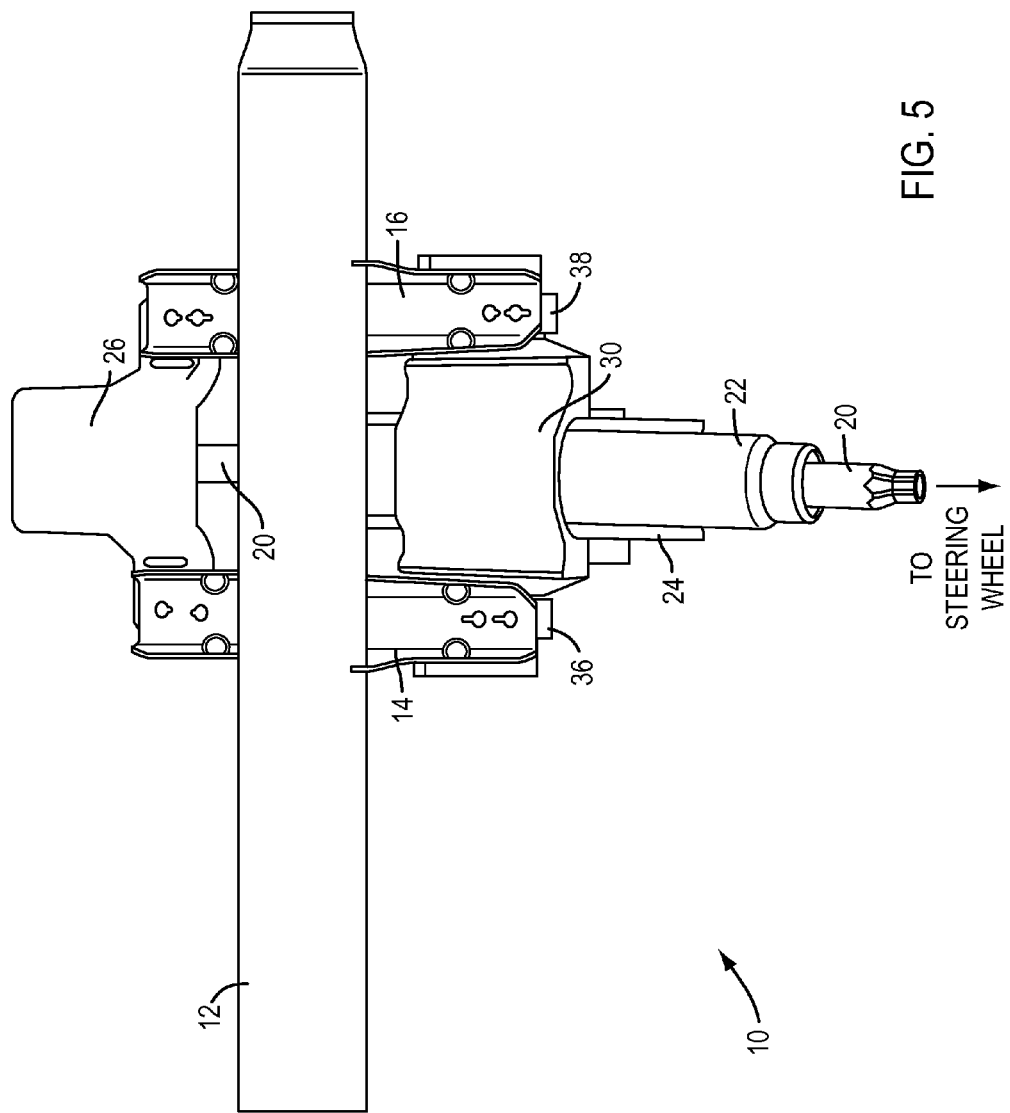
FIG. 5 is a plan view of the exemplary embodiment of the cross car assembly of FIG. 1.

As depicted in FIGS. 1-3, a set of mounting capsules 32, 34 can be attached to the upper rake bracket 30 on an edge that is closest to the steering wheel (not shown) and spaced apart on the upper rake bracket 30 typically on either side of the column shaft 20. The mounting capsules 32, 34 can be configured to fit about the edge of the upper rake bracket 30, for example as a clamp, a pinched brace or a clip both with and without known fasteners f. The mounting capsules 32, 34, for example, may be assembled as depicted to be secured to the edge of the upper rake bracket 30 using known fasteners f. The mounting capsules 32, 34 are designed to stay stationary upon impact such that the upper rake bracket 30 is allowed to move relative to the mounting capsules, and also move relative to cross car beam shoes 14, 16 to dissipate energy by allowing an amount of column stroke to absorb energy from the collision. It is contemplated that other configurations of the mounting capsules may be used and fit about the edge of the upper rake bracket 30, and the exemplary embodiments described herein are not meant to be limiting.

The mounting capsules 32, 34 can be configured to secure a set of straps 36, 38 disposed on the cross car beam shoes 14, 16 and the upper rake bracket 30. The straps 36, 38 can extend beyond the edges of the mouthing bracket 30 so that each end of the straps 36, 38 form loops that will absorb energy from a load and deform. The straps 36, 38 can be designed to any known configuration, and have been depicted in FIG. 4 as load bearing loops that will deform upon impact to dissipate energy during column stroke from the collision. It is contemplated that other configurations of the straps may be used to situate the straps 36, 38 about the mounting capsules 32, 34, upper rake bracket 30 and the cross car beam shoes 14, 16, and the exemplary embodiments described herein are not meant to be limiting. In operation, in the event of a collision creating load impact, the mounting capsules 32, 34 may deform upon load impact as the cross car assembly 10 shifts during the collision. Once the mounting capsules 32, 34 have reached a maximum load capacity, the upper rake bracket 30 may be released from the mounting capsules 32, 34 (e.g., by popping off or breaking under pressure), thereby transferring the load impact to the straps 36, 38. As the straps 36, 38 take on the load, they may deform and bend, permitting the upper rake bracket 30 to shift and slide along the column shaft axis while the cross car beam shoes 14, 16 experience relatively little to no shifting. During this sliding, the mounting capsules 32, 34 may stay tethered to the cross car beam shoes 14, 16.

In addition to the primary energy absorbing and management devices, such as capsules, straps and brackets, a secondary energy absorbing and management device may also be incorporated into the cross car assembly 10 to provide additional energy absorption during the collision. A secondary energy absorbing and management device is particularly advantageous when the impact is so severe that the impact load is greater than can be absorbed and managed by the primary energy absorbing and management device(s). In particular, the secondary energy absorption device can assist in managing impact energy during column stroke to help control the amount of column stroke that occurs during a frontal collision. Thus, the primary energy absorption and management devices, such as the mounting capsules 32, 34 and the straps 36, 38 described herein, receive the initial impact load and absorb at least a portion thereof via deformation and allowed column stroke. However, in many situations the impact load is much greater than can be handled by the primary energy absorption and management devices, wherein those devices will initially deform to the maximum possible extent, for example, to or beyond a set load or distance such as a distance of about 100 mm.

Thus, in accordance with certain embodiments of the present teachings, a pencil brace 40 can be incorporated into the cross car assembly 10 as a secondary energy absorption device to assist in managing impact energy during column stroke. The pencil brace 40 is configured to "catch" a bottom surface of the compression bracket 24 during column stroke and, in the case of a force of a given magnitude, deform and bend upon load impact to absorb energy from a secondary collision in an automotive vehicle. For instance, in continuation of the example above, as the straps 36, 38 are taking on an increased load, the upper rake bracket 30 attached to the compression bracket 24 may continue to slide along the column shaft axis until the compression bracket 24 may come in contact with the pencil brace 40 before the straps 36, 38 are fully extended and deformed. The pencil brace 40 is designed to absorb the force transferred from the straps 36, 38 from the initial impact while also being able to withstand the impact from any residual energy from the vehicle operator coming into contact with the steering wheel. In this way, the pencil brace 40 may be stronger than the primary energy absorbing and management devices in that the pencil brace 40 can withstand the load impact from the initial collision transferred from the primary energy absorbing and management devices, for example, the force from an unbelted vehicle operator colliding with the steering wheel. The pencil brace 40 may, especially with regard to unbelted passengers, be used to limit column stroke so that the vehicle operator, and in particular, an unbelted vehicle operator, is prevented from striking the vehicle windshield.

The pencil brace 40 can be designed to be adaptive to several different vehicle programs based on many different characteristics of the vehicle (or program), the steering column, and desirable column stroke characteristics upon impact. The characteristics that can be used to tune the pencil brace 40 for a given vehicle (or program) can include, among other things, the size and shape of the pencil brace 40, the material from which it is made, and the location and placement within the cross car assembly. Proper design of a pencil brace for a given vehicle (or program) preferably takes into account certain factors related to energy absorption and management such as, for example, the safety of both belted or unbelted vehicle occupants at the time of the collision, the percentile of vehicle operator, and a varying severity of impact. Often times, such designing is referred to as tuning. As used herein, the terms "tuned," "tuning," "tune," and variations thereof, refer to the adjusting the pencil brace 40 for a given steering column design in a given vehicle program, based on a variety of occupant types and variety of impact scenarios. Typically, tuning of the pencil brace 40 occurs prior to the integration of the pencil brace 40 into the vehicle. However, it is contemplated that some amount of tuning may occur after the pencil brace 40 has been integrated into the vehicle or cross car assembly.

The pencil brace 40 can be tuned to provide a desired amount of column stroke in a particular program, according to predetermined parameters for the program that preferably include design objectives for both belted and unbelted occupants. The pencil brace 40 also can be adapted to the different steering column assemblies into which it is incorporated and tuned in accordance with different vehicles (or programs). The pencil brace 40 can be tuned to make contact with different structures within the cross car assembly 10 such as, for example, the compression bracket 24, to limit column stroke when desirable. The pencil brace 40 can be tuned to take on the impact load at a certain time, or after certain events during the collision, such as after the primary energy absorbing and management devices have reached their capacity for load impact or after a predetermined amount of column stroke has occurred for a given impact force. For example, the pencil brace 40 can be tuned to withstand an impact load and deform during the second stage of column stroke following a frontal collision, by placing the pencil brace 40 at or near the lower portion of the cross car assembly 10 and situating the pencil brace 40 so that it comes into contact with only the compression bracket 24 during column stroke to limit movement of the compression bracket 24 (and thus limit column stroke) until and unless a predetermined impact force causes the pencil brace 40 to be deformed. In various embodiments of the present teachings, a greater force is required to deform the pencil brace than is required to cause deformation in the mounting capsules 32, 34 and the straps 36, 38. In addition to placement of the pencil brace, tuning of the pencil brace 40 can be accomplished by varying the location, size and shape of the pencil brace 40, as well as the material from which it is formed. The diameter and cross-sectional shape of the pencil brace 40 can also be used to tune the pencil brace 40, as can an offset angle O of the pencil brace, as described with respect to FIG. 4. The angle O may be formed by the mostly perpendicular juxtaposition of the pencil brace 40 disposed on a structure that is parallel with the axis of the steering shaft 20, such as the cross car beam shoes 14, 16. The angle O may be tuned to adjust to different vehicle programs or steering column assemblies as required. Tuning the pencil brace allows vehicle designers to select an amount of column stroke that occurs before the pencil brace 40 contacts the compression bracket 24, and an amount of force required to deform the pencil brace 40.

The pencil brace 40 can be stamped or otherwise formed from one or more materials that are sturdy and can withstand an impact load, including, but not limited to, steel, aluminum or polymers. The materials chosen to make the pencil brace 40 may vary between steering column assemblies and programs based on such factors as energy absorption and management goals, weight concerns, and pricing and availability of materials. It is contemplated that other methods of forming the pencil brace can be used such as die casting, molding or other known processes.

In the exemplary embodiment of FIGS. 1-5, the pencil brace 40 is attached to the cross car beam shoes 14, 16 using known fasteners f. It is contemplated that the pencil brace 40 can be positioned in various locations on the cross car beam shoes 14, 16 apart from the exemplary location depicted in FIGS. 1-5. The present teachings alternatively contemplate attaching the pencil brace 40 to the cross car beam 12, a different vehicle support structure that is not depicted herein, or a rigid component of the cross car assembly 10, such as, for example, the lower column bracket 26. The attachment of the pencil brace 40 is facilitated by flattened ends E of the pencil brace 40 (See, e.g., FIG. 6) in combination with known fasteners f. It is contemplated that in other exemplary embodiments there may be variations in the shape and configuration of the ends of the pencil brace that may also facilitate the attachment of the pencil brace to vehicle structures. In accordance with various embodiments of the present teachings, the flattened ends E can have apertures that may assist in facilitating the attachment and securing of the pencil brace 40 to different vehicle support structures. The size, shape and number of apertures included on the flattened ends E may vary depending on the design of the pencil brace and the vehicle or cross car assembly into which it is being incorporated. The manner of placement of the pencil brace 40 within the cross car assembly 10 is a design consideration that is typically determined prior to the actual placement in the vehicle, and can be dependent on many factors related to the design of the cross car assembly, the design, make and model of the vehicle, as well as other factors related to energy absorption and management described above, including, optimal impact energy management that takes into account scenarios where at least the vehicle operator is belted and unbelted, and various percentiles of at least the vehicle operator.

Accordingly, depending on where the pencil brace 40 is ultimately placed within the cross car assembly 10, the pencil brace 40 is configured to control, at least in part, the amount of movement of certain components of the cross car assembly 10 and thus the amount of column stroke. As depicted in FIGS. 1-4, the pencil brace 40 may be positioned between the upper rake bracket 30 and the lower column bracket 26 along the longitudinal axis of the column shaft 20. For example, in certain exemplary embodiments of the present teachings, the pencil brace 40 is shaped and tuned in such a way to make contact with the compression bracket 24 during a frontal impact collision so that the pencil brace 40 can limit the distance the compression bracket 24 slides along the axis of the cross car assembly 10 following deformation of the primary energy absorbing and management devices. The location of the pencil brace 40 guides how far the compression bracket 24 is able to slide along the axis of the column shaft 20 after the mounting capsules 32, 34 and then the straps 36, 38 can no longer bear the impact load and deform to allow the compression bracket 24 to move downward along the axis of the steering shaft 20. Upon contact with the compression bracket 24, the pencil brace 40 is designed to either hold the compression bracket 24 and limit column stroke or, under a sufficiently greater force of the steering wheel, deform and bend with an increasing impact load, thus permitting increased column stroke and movement of the steering column, during the impact of the vehicle operator colliding with the steering wheel.

Since the pencil brace 40 can be mounted at various suitable locations along the cross car beam shoes 14, 16 and can have a variety of shapes, sizes, and materials, the pencil brace 40 can be tuned between programs so that the amount of energy and allowance of column stroke can be tuned within the pencil brace 40. For instance, if a $5^{th}$ percentile occupant only requires 25 mm of column stroke, then the pencil brace 40 can be adjusted in anticipation of the amount of force that a vehicle operator in the $50^{th}$ percentile is likely to generate, thus controlling the permitted amount of column stroke by adjusting at what point in time and space the pencil brace 40 will come into contact with compression bracket 24 at 25 mm of stroke to manage the energy of a $50^{th}$ percentile occupant. Similarly, the pencil brace 40 can be adjusted in anticipation of the amount of force that a vehicle operator in the $5^{th}$ percentile is likely to generate, thus controlling the permitted amount of column stroke by adjusting at what point in time and space the pencil brace 40 will come into contact with compression bracket 24 at 25 mm of stroke to manage the energy of a $5^{th}$ percentile occupant.

When the vehicle operator engages the steering wheel, the primary energy absorbing and management devices can deform to prevent injury to the vehicle occupant, and then the pencil brace 40 can resist and absorb additional crash energy gradually, providing a controlled reaction force against the vehicle operator. Specifically, during column stroke, following deformation of any primary energy absorbing and management devices, the compression bracket 24 contacts and loads the pencil brace 40. The pencil brace 40 will prevent movement of the compression bracket 24 or will deform and load in tension in order to absorb the additional crash energy. Once the maximum amount of load from the impact is reached, the steering column 24 will no longer stroke. Thus, the pencil brace 40 provides a controlled resistance of the steering wheel against the vehicle operator, gradually absorbing energy to prevent excessive reaction force of the steering wheel against the vehicle operator and also being configured to restrain a vehicle operator (and particularly an unbelted vehicle operator) in a manner that prevents the vehicle operator from contacting the windshield.

In general, the pencil brace 40 is designed to be able to simply and inexpensively provide enough support, mounting strength and stability, but also be able to adapt to a variety of steering column assemblies and vehicle programs without losing functionality. Thus, further to the characteristics already described, the pencil brace 40 can be tuned to have a height h, measured from the bottom of the flattened ends E to a top edge of the center portion c, sufficient to make contact with a first component of the cross car assembly 10, such as the compression bracket 24, while not contacting any other component of the cross car assembly, such as fasteners or other structural components. For instance, the pencil brace 40 may make contact with the compression bracket 24 during column stroke and may control and limit in part the sliding of the compression bracket 24 and parts of the steering column attached to the compression bracket 24, and further assist in dissipating energy in the event of a collision. The pencil brace 40 can have a width w, measured between an outer end of each of the flattened ends E, sufficient to span a predetermined portion of the cross car assembly 10 such that it is mountable to a fixed portion of the cross car assembly 10 or the vehicle support structure. For instance, the width of the pencil brace 40 can be designed to allow the pencil brace 40 to mount appropriately to designated structural components such as the illustrated cross car beam shoes 14, 16, while spanning the width of the cross car assembly 10.

The pencil brace 40 also can be shaped, designed, and mounted to withstand a predetermined impact load during a collision such that the pencil brace 40 is configured to prevent movement of a first component of the cross car assembly 10 such as the compression bracket 24, along the longitudinal axis of the column shaft 20. For instance, the pencil brace 40 can be designed to have a thickness/diameter and cross sectional sufficient to allow the pencil brace 40 to withstand an impact load that it receives during column stroke following a collision, and deform to a desired amount upon application of a predetermined load. The pencil brace can have a cross-sectional shape that includes one or more of, for example, a circular, oval, rectangular, square, or an I-beam shape.

The material of the pencil brace 40 can be integral to the tuning process of the pencil brace 40. While the illustrated exemplary pencil brace 40 has a given shape, the pencil brace can alternatively have a U-shaped, V shaped, arc-shaped, square-shaped or other angular-shaped curved configuration. The size and shape of the pencil brace 40 can be selected to allow the pencil brace to span certain components of the cross car assembly, to impede motion of certain components of the cross car assembly (e.g., the compression bracket 24), and to attach one or more vehicle structural components, such as the cross car beam 12 or cross car beam shoes 14, 16.

Figure 6:
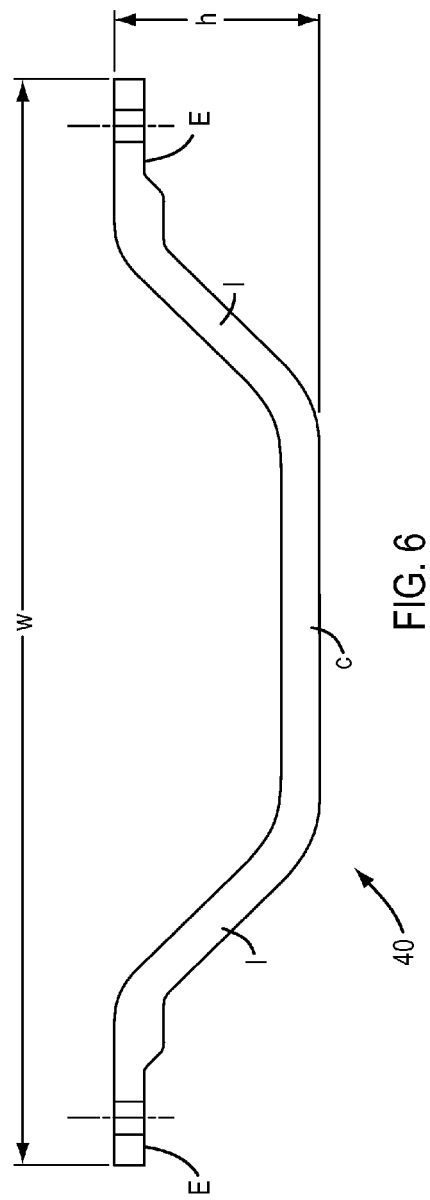
FIG. 6 is an illustration depicting an exemplary embodiment of the pencil brace in accordance with the present teachings.
Figure 7:
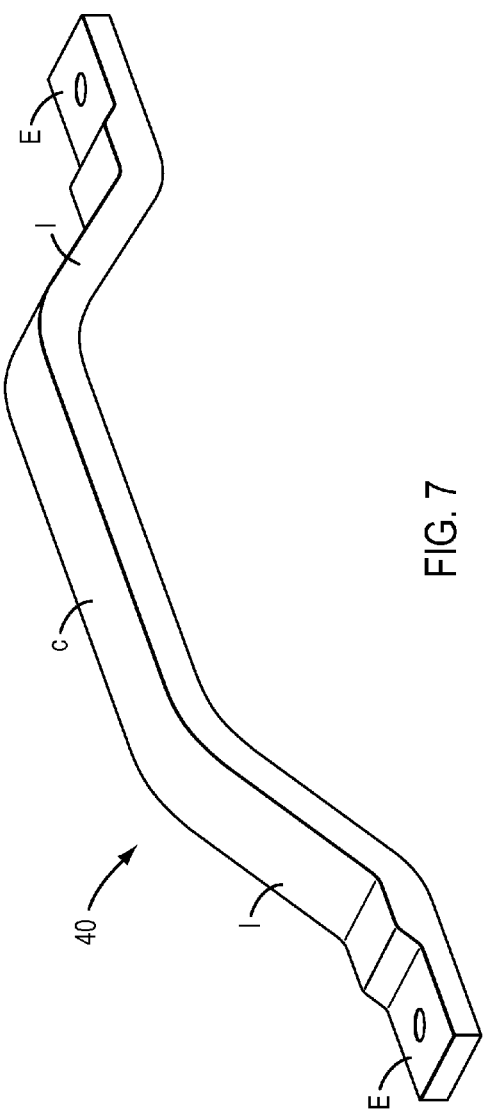
FIG. 7 is another illustration of the exemplary embodiment of the pencil brace of FIG. 6.

The pencil brace 40 can have a shape sufficient to withstand a predetermined impact load, wherein the shape may include one or more portions suitable for attachment to a vehicle structural component of the cross car assembly. For example, the pencil brace 40 can have flattened ends E that are spaced apart a sufficient distance to facilitate the attachment to the cross car beam shoes 14, 16, as depicted in FIGS. 6 and 7. In accordance with certain embodiments of the present teachings, the shape of the pencil brace 40 may also optionally be designed to include notches or triggers within a portion of the pencil brace, as well as a central portion c and a leg portion l providing increased areas for adjustment and tuning. The notches or triggers can be used to tune the pencil brace 40 by adjusting the amount and location of pencil brace deformation during impact. As can best be seen in FIG. 4, the leg portions l of the pencil brace 40 can have a predetermined offset angle O with a longitudinal axis of the column shaft 20. For instance, in FIG. 4 the pencil brace is shown to be at an angle O with respect to the portion of the upper rake bracket 30. The offset angle O can allow the pencil brace 40 to be tuned such that its central portion c makes contact with the compression bracket 24 during column stroke at a location that is not exactly above the flattened ends E. This can allow flattened ends E of the pencil brace 40 to be attached to the cross car assembly 10 at a location other than where the pencil brace 40 is desired to make contact with the compression bracket 24, giving a greater flexibility for mounting locations. In addition, the offset of the leg portions l can tune both the location where the pencil brace 40 contacts the compression bracket 24, and also the strength of the pencil brace 40 in withstanding a force applied by the compression bracket 24 prior to deforming.

It is contemplated that in alternative configurations of steering column assemblies, a pencil brace in accordance with the present teachings may vary in size, shape, position and placement as well as the material from which it is made, in order to supply the most efficient energy absorption and management for the particular vehicle within which it is situated.

While the present teachings have been disclosed in terms of exemplary embodiments in order to facilitate better understanding of the present teachings, it should be appreciated that the present teachings can be embodied in various ways without departing from the principle of the teachings. Therefore, the present teachings should be understood to include all possible embodiments which can be embodied without departing from the principle of the teachings set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present teaching. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its teachings. Other embodiments of the disclosure will be apparent to those skilled in the art from consideration of the specification and practice of the teachings disclosed herein. It is intended that the specification and embodiment described herein be considered as exemplary only.

What is claimed is:

1. A pencil brace for use in a cross car assembly having a longitudinal axis, the cross car assembly comprising a compression bracket, a column shaft, an upper shaft jacket, a lower column bracket, and an upper rake bracket, wherein the upper shaft jacket partially and rotatably surrounds the column shaft, and is telescopically collapsible relative to a lower portion of the cross car assembly, wherein the compression bracket attaches to the upper rake bracket to partially enclose the upper shaft jacket, and wherein the upper rake bracket and the lower column bracket are secured to the cross car beam shoes, the pencil brace comprising:

a height sufficient to make contact with the compression bracket of the cross car assembly;

a width sufficient to span a predetermined portion of the cross car assembly; and a shape sufficient to withstand a predetermined impact load, the shape including one or more portions suitable for attachment to the cross car beam shoes of the cross car assembly, wherein the pencil brace is configured to prevent movement of the compression bracket of the cross car assembly along the longitudinal axis.

2. The pencil brace of claim 1, wherein the cross car assembly comprises a primary impact energy absorbing structure configured to deform and bend upon load impact during column stroke, and wherein the pencil brace is configured to deform and bend upon load impact when there is excessive column stroke not controlled by the primary impact energy absorbing structure.

3. The pencil brace of claim 2, wherein the primary impact energy absorbing structure comprises at least one mounting capsule and at least one strap, the at least one mounting capsule being configured to deform and bend upon load impact during column stroke.

4. The pencil brace of claim 1, wherein the pencil brace is secured to the cross car assembly at an angle with the longitudinal axis of the column shaft, and wherein the angle further facilitates the contact of the pencil brace with the first component of the cross car assembly during a collision.

5. A cross car assembly, comprising:
a column shaft situated within an upper shaft jacket, an upper rake bracket being mounted to the column shaft and mounted directly or indirectly to a vehicle support structure;
at least one primary energy absorbing and management device configured to deform upon a frontal impact of a vehicle to allow column stroke and manage impact energy;
a pencil brace configured to act as a secondary energy absorbing and management device and configured to stop or limit column stroke after the primary energy absorbing and management device has deformed;
wherein the pencil brace is mounted to be spaced a predetermined distance from a compression bracket, and wherein the predetermined distance defines a column stroke that occurs before the compression bracket strikes the pencil brace.

6. The cross car assembly of claim 5, wherein the pencil brace is mounted directly or indirectly to the vehicle support structure.

7. The cross car assembly of claim 5, wherein the frontal impact generates one or more forces during a collision, wherein the at least one primary energy absorbing and management device initially deforms according to a set load and distance and the pencil brace deforms according to any residual energy.

8. The cross car assembly of claim 7, wherein the at least one primary energy absorbing and management device is used to mount the compression bracket to the upper rake bracket, and wherein the at least one primary energy absorbing and management device is released upon application of a force from an occupant.

9. The cross car assembly of claim 8, wherein the pencil brace stops movement of the compression bracket and deforms to allow limited movement of the compression bracket once the primary energy absorption device has reached a predetermined distance from the compression bracket.

10. The cross car assembly of claim 5, wherein the pencil brace is mounted at an offset angle.

11. The cross car assembly of claim 5, wherein the pencil brace strikes only the compression bracket upon column stroke.

12. The cross car assembly of claim 5, further comprising two primary energy absorbing and management devices that include a capsule and a strap.

* * * * *